May 5, 1953  L. M. NICHOLS  2,637,566
AUTOMOBILE HITCH
Filed March 23, 1951
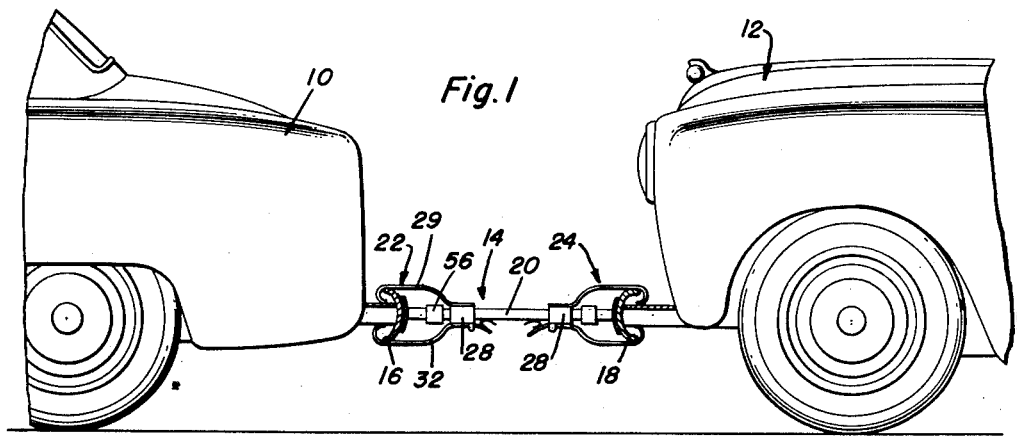
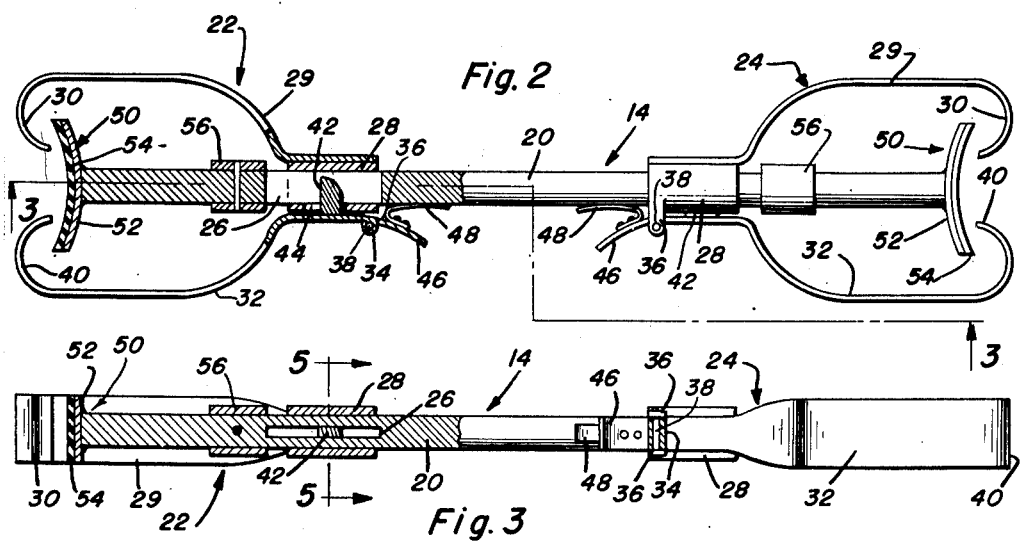
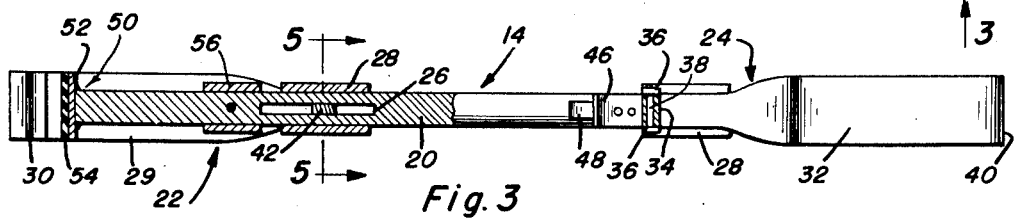
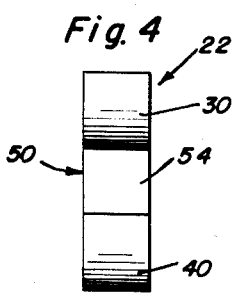
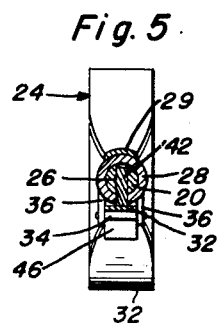
Lloyd M. Nichols
INVENTOR.

Patented May 5, 1953

2,637,566

UNITED STATES PATENT OFFICE 2,637,566

AUTOMOBILE HITCH

Lloyd M. Nichols, Pittsburg, Kans.

Application March 23, 1951, Serial No. 217,193

3 Claims. (Cl. 280—33.13)

This invention relates to improvements in hitches for coupling vehicles together for towing or pushing each other.

An object of this invention is to provide an improved hitch for coupling the rear bumper of one vehicle to the front bumper of another, said hitch including a bar with identical assemblies at each end, each assembly having a pair of elements to engage behind the bumper of a vehicle and a padded saddle to contact the front surface of the bumper and each assembly being slidable on the bar whereby various configurations and thicknesses of bumpers may be accommodated.

Ancillary objects and features of importance will become apparent in following the description of the illustrated form of the invention.

In the drawings:

Figure 1 is a fragmentary elevational view of a pair of coupled vehicles having the device attached thereto and showing the bumpers of the vehicles in section;

Figure 2 is an elevational view of the device in enlarged scale with portions being broken away in section to illustrate internal details;

Figure 3 is a sectional view taken substantially on the line 3—3 of Figure 2 and in the direction of the arrows;

Figure 4 is an end view of the device, and

Figure 5 is a sectional view taken substantially on the line 5—5 of Figure 3 and in the direction of the arrows.

As disclosed in Figure 1 there is the rear part of a vehicle 10 together with the front part of a vehicle 12, the two vehicles being connected together whereby one may push the other or the vehicle following may be towed or pulled by the vehicle 10. The hitch or coupling 14 is connected to the bumper 16 of the vehicle 10 and the bumper 18 of the vehicle 12. In order for a coupling device for vehicles to be commercially practicable it, of necessity, must be simple in construction and yet durable and easily attached and detached. With this in view I have provided a bar 20 with identical assemblies at the front and rear ends thereof. The assembly 22 is located at the forward end of the bar 20 while the assembly 24 is located at the rear end of the bar 20.

The bar is provided with a slot 26 passing entirely therethrough near, but spaced from the front end thereof. A collar 28 is slidably disposed on the front end of the bar 20 and adapted to overlie a part of the slot 26. This collar has an upper arm 29 fixed at its inner end to the collar by standard means, as welding. The front end of the arm 29 is smoothly curved and substantially hook-shaped as shown at 30.

There is a lower arm 32 provided with an ear 34 near its rear end and the ear is located between brackets 36 and connected to the brackets by means of an assembling and pivoting pin 38. This mounts the lower arm 30 for pivotal movement with respect to the collar 28.

The outer end of the arm 32 is smoothly curved and substantially hook-shaped as indicated at 40 and is of the same curvature and shape as the end 30 of the arm 29 and is spaced slightly from the latter.

A keeper latch 42 is fixed to the arm 32, passed through an opening 44 in the collar 28 and located in the slot 26. This keeper prevents the collar from rotating on the bar 20 and is used as a latch as well as a keying lug. The extreme inner end of the arm 32 is curved downwardly slightly as at 46 and there is a leaf spring 48 secured thereto and slidably resting upon the outer surface of the bar 20 near the center thereof.

A saddle 50 is fixed to the front end of the bar 20 and consists of a saddle plate 52 which is smoothly curved to conform generally to a part of a vehicle bumper. A pad 54, preferably of resilient material, for example, rubber, is fixed to the front surface of the saddle plate 52 and adapted to contact the outer surface of the vehicle bumper.

Inasmuch as the rear assembly 24 is identical to the assembly 22, a detailed description thereof is deemed unnecessary. In operation the assembly 22 or 24 is coupled to the vehicle bumper 18 by pivotally operating one of the arms, each arm constituting one part of a jaw. The collar appurtenant to the arms being coupled with the vehicle bumper is slid on the bar 20 to facilitate attachment and to compensate for various configurations and sizes of vehicle bumpers on different makes of automobiles or trucks.

The other assembly on the bar 20 may be coupled to the rear bumper of a vehicle in a similar fashion or if desired, the rear vehicle may be moved slowly toward the front vehicle with the bar and assembly 22 being held appropriately. The motion of the rear vehicle will cause pivotal movement of the lower arm of the assembly necessary to snap the curved portions of the arm over and below the vehicle bumper. At this time the front saddle and the rear saddle will be in contact with the surfaces of the vehicle bumpers so that the rear vehicle may push the front vehicle. Although the device is designed primarily for pushing, it may be used for pulling vehicles.

When the hitch is used for pulling it has been necessary to relieve the keeper-latch 42 of sheering stress and strain and this is accomplished by providing a stop shoulder to limit the sliding movement of the collar 28 in one direction. Take the hitching means or jaws 24 at the right in Figure 2. Assuming that 10 is now "pulling" or towing 12 and the hooks 30 and 40 are engaged in the manner shown, the whole assembly 24 will slide on the rod 20 and the collar 28 will ride into end thrust engagement with the stop collar or sleeve 56 which latter is suitably fixed on the rod 20. Now, the pulling force of the latter imposes the load on the hooked jaws 29 and 32 and the forces are transmitted to collar 28 resting against collar 56 carried by the rod or bar 20.

It is thought that persons skilled in the art to which the invention relates will be able to obtain a clear understanding of the invention after considering the description in connection with the drawings. Therefore, a more lengthy description is regarded as unnecessary.

Minor changes in the shape, size, materials and arrangement of parts may be resorted to in actual practice without departing from the spirit and scope of the invention, as claimed.

Having described the invention, what is claimed as new is:

1. A coupling for vehicles, said coupling comprising a rigid one-piece bar having means at one end to attach to one vehicle and having a slot adjacent to but spaced inwardly from the opposite end, a saddle secured to said opposite end and adapted to contact a vehicle bumper, a collar embracing and slidably disposed on said bar and having jaws secured thereto, one of said jaws being mounted for pivotal movement for manual release and attachment of the jaws to the vehicle bumper, and means located in said slot for preventing rotation of said collar on said bar, a cushion constituting a part of said saddle, and said jaws having outer surfaces constituting cams to facilitate sliding of the jaws on the bumper.

2. A device for coupling vehicles together, said device being adapted to attach to vehicle bumpers and including a one-piece bar with an integral saddle at each end to contact the outer surface of the vehicle bumpers, means at one end of the bar to couple with the bumper of one vehicle, and means at the other end of the bar to attach to the bumper of the other vehicle, said last-mentioned means including a collar slidably disposed on said bar and having an arm fixed at one end thereto, a hook-shaped jaw at the outer end of said arm, a second arm pivoted to said collar, a hook-shaped jaw at the outer end of said second arm, said bar having a slot therein, and a keeper fixed to said second arm and extending into said slot by way of an aperture in said collar to prevent said collar from rotating on said bar.

3. A device for coupling vehicles together by way of its connection with cooperating bumpers on at least two vehicles comprising a rigid one-piece bar having an integral saddle at one end and means cooperating with said saddle for separably joining the same with one bumper, said bar being provided at its opposite end with an integral saddle and inwardly of the saddle with a longitudinally extending slot and between the slot and saddle with a fixed sleeve providing an abutment at one end of said slot, a collar slidable on the slotted portion of the rod and adapted to engage the sleeve at one end of the latter, said collar having an aperture in alignment with said slot, a first jaw secured at one end to said collar and having a bumper engaging hook at its opposite end, a second jaw member pivotally mounted on said collar and located diametrically opposite to said first-named jaw and provided at one end with a bumper engaging hook, said hooks being directed toward each other in cooperating relation with said saddle, and a lug formed integrally with the pivotally connected end of said second-named jaw, said lug extending through the aperture in the collar and into said slot.

LLOYD M. NICHOLS.

References Cited in the file of this patent

UNITED STATES PATENTS

| Number | Name | Date |
|---|---|---|
| 1,568,204 | Blade | Jan. 5, 1926 |
| 2,107,312 | Thompson | Feb. 8, 1938 |
| 2,127,387 | Brattain | Aug. 16, 1938 |
| 2,497,234 | Mylie | Feb. 14, 1950 |
| 2,554,375 | Morreale | May 22, 1951 |